United States Patent Office 2,975,091
Patented Mar. 14, 1961

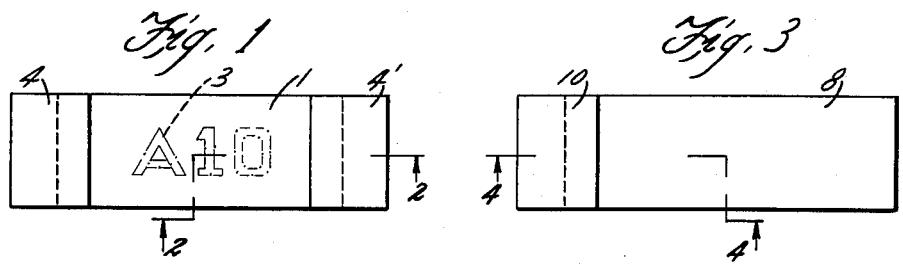
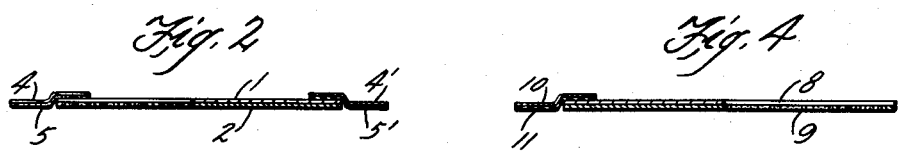
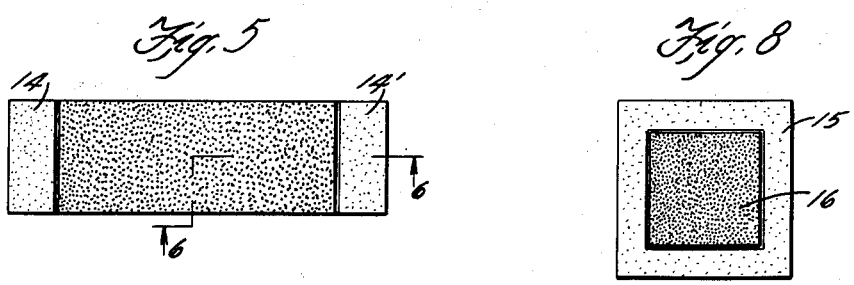
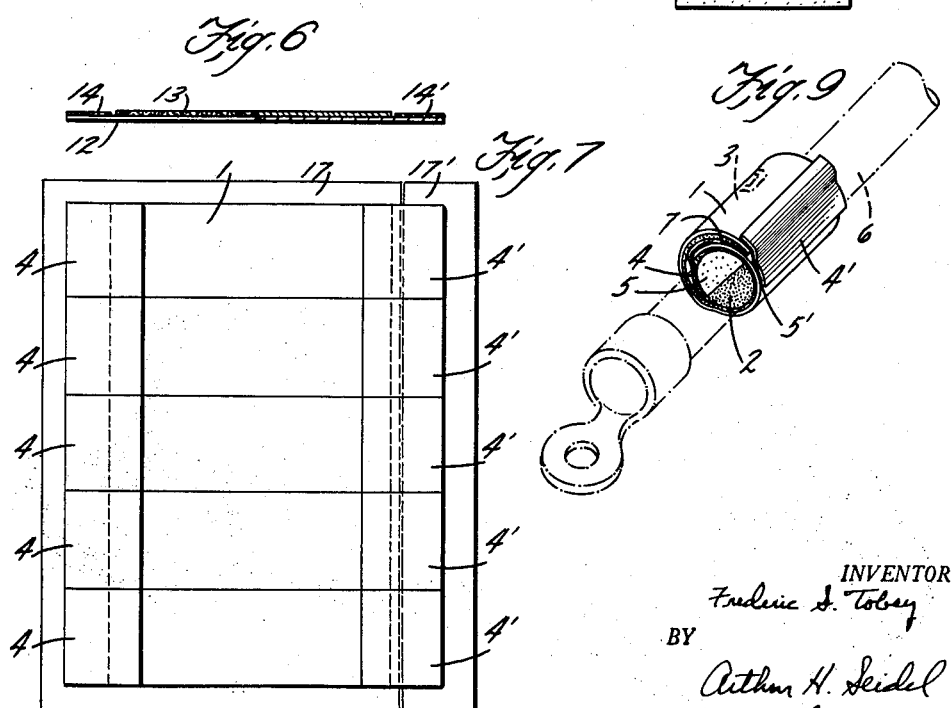

2,975,091
HEAT-RESISTANT ADHESIVE ARTICLE

Frederic S. Tobey, Sharon, Mass., assignor to W. H. Brady Co., Milwaukee, Wis., a corporation of Wisconsin Filed July 21, 1955, Ser. No. 523,468

1 Claim. (Cl. 154—53.5)

This invention relates to adhesively attached labeling and masking means and it resides more particularly in a pliant sheet material having an adhesive coating, a portion of which is permanently tacky at ordinary temperatures and another portion of which develops its tackiness and adhesive character for bonding purposes only at temperatures substantially above room temperature; the temperature resistant adhesive coating being subject to curing, if desired, under the influence of elevated temperatures, to form a permanent adhesive bond.

Heretofore, permanently tacky or pressure sensitive adhesive has been applied to various sheet materials such as paper, cloth, plastic film and the like to form pliant articles which may be used for masking purposes or printed or otherwise marked so that the same can be employed for labeling. The advantages and convenience of such masking and labeling have rendered articles thus formed of particular usefulness for the assembling of electrical parts or the marking of electrical wires, leads, terminals and the like.

In certain instances, such articles are subjected to temperatures at which permanently tacky adhesive masses become softened or otherwise weakened to the point where they are ineffective. For example, electrical elements which are subjected to baking to fix the insulating varnishes applied thereto are usually brought to temperatures during such baking which are well above the highest temperature which permanent tacky adhesive will tolerate. If electrical parts are labeled with permanently tacky adhesive and baked in this fashion the adhesive mass usually melts causing the label either to loosen or actually fall away.

In the manufacture of electrical devices, which are to be varnished and baked, identification of the leads by labeling means which are not subject to possible displacement is essential. In certain instances transformers require labeling which will withstand immersion in oil, and this requirement also renders permanently tacky adhesives useless since they are readily attacked by oil.

In an effort to meet the requirements for electrical labeling means which will withstand higher temperatures and exposure to oil, some have applied metal tags or bands to the leads to be identified, but this is open to objection because of the expense and bulk of the metal articles and because of their adverse effect upon insulation.

It is an object of this invention to provide a non-metallic, self-adhering sheet article which may be used with the readiness and convenience of a pressure sensitive article, but which will remain permanently attached after exposure to temperatures substantially above room temperature and which will be resistant to attack by oil.

The foregoing and other objects and advantages of the present invention will appear from the description hereinafter set forth wherein reference is made to the accompanying drawings which form a part hereof, in which there is shown by way of illustration, and not of limitation, specific forms in which this invention may be embodied.

In the drawings:

Fig. 1 is a plan view of one form of the label of this invention,

Fig. 2 is a side view in elevation and partly in section viewed as indicated at 2—2 in Fig. 1, Fig. 3 is a plan view of a simplified form of the label of this invention, Fig. 4 is a side edge view in elevation and partly in section viewed as indicated at 4—4 in Fig. 3, Fig. 5 is a bottom plan view of another form of the label of this invention in which a single body sheet is employed, Fig. 6 is a side view in elevation and partly in section viewed as indicated at 6—6 in Fig. 5, Fig. 7 is a top plan view showing a plurality of labels of the form appearing in Fig. 1 mounted side by side on a backing board for dispensing purposes, Fig. 8 is a bottom plan view of another form of the label of this invention, and Fig. 9 is a perspective view of a label of this invention in the configuration which the same assumes when in use.

The form of the article of this invention appearing in Figs. 1 and 2 is suitable for use as a label for electrical wiring. The article in this form may be made up of a principal label strip 1 coated beneath with a layer of a substance which when brought to a temperature above room temperature will soften and develop adhesive characteristics. The strip 1 upon which the coating 2 is carried is preferably made of a durable fabric or felted fibre substance such as paper selected for resistance to deterioration at elevated temperature. Labeling indicia 3 may be printed or otherwise marked upon the strip as shown in dotted lines.

The coating 2 is composed of a partially condensed or otherwise advanced synthetic thermo-setting resin adhesive compound to respond to heating by softening and forming an adhesive bond prior to final curing and setting of the resin.

Adhesives containing thermosetting resins have in general been found suitable for the purposes of this invention and some examples comprise the following: phenol-formaldehyde, resorcinol-formaldehyde, resorcinol-phenol-formaldehyde, urea resorcinol, melamine-formaldehyde, melamine-urea-formaldehyde, and epoxy resin materials.

A suitable adhesive may be prepared, by way of example, by placing together 100 parts by weight of a phenol-aldehyde resin solution containing 60% solids and 40% toluene, 24 parts by weight of a solution containing 60% epoxy resin and 40% methyl ethyl ketone, 6 parts by weight of a solution containing polyvinyl-butyral 25%, and 75% of an ethyl alcohol-toluene solvent, 13.2 parts by weight of hexamethylenetetramine. This solution may be coated on paper, such as drug bond, to form a layer about 2 to 4 mils in thickness and then dried and initially cured by gentle heating at a temperature of say 70 degrees centigrade for about 15 minutes.

The coating formed from the above composition, while somewhat flexible, is smooth and non-tacky at room temperature. Upon heating to a temperature of say 150 degrees centigrade for about 15 minutes or more the coating first softens, flows and then becomes highly tacky after which, upon further curing, it permanently sets forming a tough tenacious permanent bond. An effective body may be obtained also at lower temperatures maintained for a longer interval, say 100 degrees centigrade for one hour or at a higher temperature, say 160 degrees centigrade for about 10 minutes.

Overlapping the ends of the principal label element 1 are initial attachment elements 4 and 4' formed of pliant sheet material carrying pressure sensitive adhesive coatings 5 and 5' respectively. The pressure sensitive adhesive coating is formed of a rubber composition or equivalent which remains permanently tacky and forms an adhesive bond upon simple contact without activation by solvent or heat.

In use, the article appearing in Fig. 1 may be employed as illustrated in Fig. 9 where the label is shown wrapped about a cable 6 indicated in dotted lines. The pressure sensitive adhesive coating 5 of the initial attachment element 4 may be placed in contact with the cable surface and the principal label element thereafter wrapped around the cable. In this way the coating 2 of the principal element 1 is brought into contact with a substantial part of the cable surface and in contact with the outer surface of the initial attachment element 4 and with a portion of the outer surface of the principal element itself indicated at 7. The initial attachment element 4' then serves to hold the wrapped label in position as shown.

When the assembly shown in Fig. 9 is subjected to heating the coating 2 first softens, flows and forms a bond with the surface of the cable 6 and also with the outer surface of the element 1 at the overlapped area 7. Further heating cures or sets the adhesive coating 2 rendering the bond permanent. In the meantime, the adhesive coatings 5 and 5' begin to lose strength but not until the coating 2 has formed a secure attachment. Thereafter heating to temperatures well above those which would be destructive of the coatings 5 and 5' will not cause the label to loosen because the bond produced by the coating 2 has been rendered permanent. If the unit is subsequently immersed in oil the bond formed by the coating 2 will retain the label.

Even in cases where the cable 6 may be provided with a coating which is not receptive with respect to the adhesive coating 2 a secure attachment is obtained, nevertheless, by reason of the overlapped area 7.

In certain instances it may be unnecessary to provide an initial attachment element at both ends of the label in which event a label may be constructed as appears in Figs. 3 and 4 where a principal label element 8 provided with a heat activated thermo-setting coating 9 is overlapped at one end only by an initial attachment element 10. The element 10 is provided with a pressure sensitive adhesive coating 11 as shown.

In other instances the double thickness of the initial attachment element and principal label element which is present in the overlapped areas of the articles shown in Figs. 1 and 3 may be objectionable. In that event the article of the invention may be constructed in the form appearing in Figs. 5 and 6. In this form a single pliant sheet of fabric, paper or film 12 is provided. Adhering to the median area of the label is a coating 13 which is subject to being activated by heating and which is cured and permanently set in the same fashion. The ends of the strip 12, whether or not covered by the coating 13, are coated as indicated at 14 and 14' with a pressure sensitive adhesive as shown. The manner of use of the label shown in Figs. 5 and 6 is comparable to that described in connection with the label appearing in Fig. 1.

For some labeling or masking purposes an initial attachment may be required which precludes access of extraneous substances to the interface between the article to be masked and the heat activated adhesive. In such cases a pliant sheet may be provided as shown in Fig. 8 with a continuous margin 15 of pressure sensitive adhesive and with a central area 16 of heat activated adhesive.

A further advantage of the article of this invention is the convenience with which it may be dispensed when being used for marking and similar functions. In such cases it is convenient to secure the labels or other articles to a backing material such as vulcanized fibre in the form of a mounting card as shown in Fig. 7. In this figure a mounting card 17 is shown, having a separate margin portion 17', upon which a plurality of labels of the type shown in Fig. 1 is mounted. In this case the initial attachment elements 4 and 4' are in easily separated adhesive contact with the mounting card 17—17'. The portion 17' may be separated from the main backing card 17 as shown, thus exposing the ends of the initial attachment elements 4' to facilitate removal of the labels.

I claim:

A self-adhering pliant article to be attached to an object by being placed against the object and held in such position while subjected to elevated temperatures, which article comprises an elongated piece of pliable sheet material having a lengthwise dimension defining opposite ends whereby said pliable sheet material is adapted to be wrapped about an object; a heat activatable adhesive coated upon a surface of said pliable sheet material that is substantially non-tacky at normal room temperatures to present a face for the pliable sheet material that may be brought into engagement with a surface with which adhesion is to be made without adherence at the time of positioning, which adhesive will be rendered tacky upon subsequent heating to bond with such surface; an initial attachment tab of thin flexible material that is disposed at one end of said elongated sheet material in overlapping relation thereto with a portion extending beyond the elongated sheet material to form a short continuation thereof; and a coating of pressure sensitive adhesive on the side of said tab facing the elongated sheet material which adheres the tab to the elongated sheet material and which also covers the portion of the tab extending beyond the elongated sheet material to present an exposed tacky adhesive surface adjacent the heat activatable adhesive, which surface is an initial attachment surface for holding the article in position prior to a heating that causes said heat activatable adhesive to become tacky and to form a bond.

References Cited in the file of this patent

UNITED STATES PATENTS

| Number | Name | Date |
|---|---|---|
| 600,745 | Sands | Mar. 15, 1898 |
| 693,514 | Haberstroh | Feb. 18, 1902 |
| 1,575,844 | Jones et al. | Mar. 9, 1926 |
| 2,039,284 | Hartzell | May 5, 1936 |
| 2,096,750 | Lawrence | Oct. 26, 1937 |
| 2,294,347 | Bauer | Aug. 25, 1942 |
| 2,493,267 | Scholl | Jan. 3, 1950 |
| 2,521,911 | Greenlee | Sept. 12, 1950 |
| 2,631,947 | Kline | Mar. 17, 1953 |
| 2,633,139 | Pettey | Mar. 31, 1953 |
| 2,633,432 | Kenneway | Mar. 31, 1953 |
| 2,721,810 | Schram | Oct. 25, 1955 |
| 2,736,448 | Winn | Feb. 28, 1956 |

FOREIGN PATENTS

| 637,036 | Great Britain | May 10, 1950 |
|---|---|---|

OTHER REFERENCES

Epon Surface Coating Resins (Scholl Chemical Corporation).